US008235640B2

(12) United States Patent
Balboni et al.

(10) Patent No.: US 8,235,640 B2
(45) Date of Patent: Aug. 7, 2012

(54) APPARATUS FOR MOVING CONTAINERS

(75) Inventors: Gianni Balboni, Molinella (IT); Samuele Bellan, Prato (IT); Franco Gironi, Barberino del Mugello (IT); Paul Stewart, Youngstown, NY (US)

(73) Assignee: Telstar Technologies, S.L. (ES)

( * ) Notice: Subject to any disclaimer, the term of this patent is extended or adjusted under 35 U.S.C. 154(b) by 725 days.

(21) Appl. No.: 12/374,263

(22) PCT Filed: Jul. 17, 2007

(86) PCT No.: PCT/EP2007/057373

§ 371 (c)(1),
(2), (4) Date: May 5, 2009

(87) PCT Pub. No.: WO2008/009678

PCT Pub. Date: Jan. 24, 2008

(65) Prior Publication Data

US 2009/0241362 A1 Oct. 1, 2009

(30) Foreign Application Priority Data

Jul. 18, 2006 (EP) .................................... 06014888

(51) Int. Cl.
*B65G 47/82* (2006.01)
*F26B 5/06* (2006.01)

(52) U.S. Cl. .................. 414/222.12; 414/214; 198/429; 198/736; 198/747

(58) Field of Classification Search .................. 198/429, 198/598, 736, 738, 747; 414/214, 222.12, 414/226.03, 910; 221/312 B
See application file for complete search history.

(56) References Cited

U.S. PATENT DOCUMENTS

| | | | | |
|---|---|---|---|---|
| 3,469,327 | A * | 9/1969 | Catelli et al. | 34/92 |
| 4,139,108 | A * | 2/1979 | Kamp et al. | 414/749.1 |
| 4,396,338 | A * | 8/1983 | Applegate et al. | 198/347.3 |
| 4,669,938 | A * | 6/1987 | Hayward | 414/156 |
| 4,760,638 | A * | 8/1988 | Ott et al. | 29/732 |
| 5,129,162 | A * | 7/1992 | Hemmersbach et al. | 34/284 |
| 5,551,821 | A * | 9/1996 | Hall | 414/18 |
| 5,649,800 | A * | 7/1997 | Hemmersbach et al. | 414/180 |
| 6,036,425 | A * | 3/2000 | Seto | 414/277 |
| 6,899,511 | B2 * | 5/2005 | Gurevich et al. | 414/749.1 |
| 7,216,755 | B2 * | 5/2007 | Focke et al. | 198/418.1 |
| 7,343,696 | B2 * | 3/2008 | Covert | 34/92 |
| 7,534,081 | B2 * | 5/2009 | Zobel et al. | 414/222.01 |
| 7,695,230 | B2 * | 4/2010 | Selch | 414/180 |
| 7,762,383 | B2 * | 7/2010 | Damen | 198/429 |
| 7,766,152 | B2 * | 8/2010 | Damen | 198/370.07 |

FOREIGN PATENT DOCUMENTS

| | | | |
|---|---|---|---|
| DE | 295 07 589 | U1 | 7/1995 |
| DE | 103 07 571 | A1 | 9/2004 |
| FR | 2 182 360 | A | 12/1973 |
| WO | WO 2005/121672 | A1 | 12/2005 |

* cited by examiner

*Primary Examiner* — Douglas Hess
(74) *Attorney, Agent, or Firm* — Laubscher & Laubscher, P.C.

(57) ABSTRACT

An apparatus for moving containers into or from a chamber provided with at least a supporting surface for the containers, comprises a pushing element for engaging the containers and a driving arrangement for moving the pushing element through the chamber along a sliding direction, the driving arrangement comprising, a modular rod assembly for supporting the pushing element and including a set of rod elements which can be mutually and removably associated, an assembling arrangement for connecting or disconnecting the rod elements to or from the modular rod assembly so as to change a length thereof and to move the pushing element.

49 Claims, 10 Drawing Sheets

APPARATUS FOR MOVING CONTAINERS

This application is a continuation of PCT International Application No. PCT/EP2007/057373 filed Jul. 17, 2007. PCT/EP2007/057373 claims priority to EP Application No. 06014888.9 filed Jul. 18, 2006. The entire contents of these applications are incorporated herein by reference.

The present invention relates to an apparatus for moving containers into and from an apparatus for treating material contained in such containers.

In particular the invention concerns an apparatus for loading or unloading containers into or from a freeze dryer or the like.

Freeze dryers are used for freeze drying products, i.e. pharmaceutical or food products, and typically comprise a freeze drying chamber for receiving a plurality of containers containing the product to be dried.

The drying chamber is provided with a plurality of flat trays or shelves, on which the containers are positioned. The shelves are positioned one above another, vertically spaced and stacked.

A moving arrangement can be provided for moving vertically the shelves and for positioning each shelf in front of an opening of the drying chamber for loading or unloading the containers.

A loading apparatus is provided in front of the opening for pushing the containers from a feeding conveyor onto a shelf of the drying chamber. The loading apparatus can move one or more rows of containers at time or the whole amount of containers to be placed on the shelf.

Similarly, an unloading apparatus is provided opposite to the loading apparatus, i.e. in the rear part of the chamber, for pushing the containers from a shelf positioned inside the drying chamber to the feeding conveyor through the opening.

As the freeze drying process requires sterility of product and containers, especially for pharmaceutical products, the freeze dryer is usually placed inside a clean room. Sterility is also required for all the elements and members that are in contact with the product and the containers, such as the loading and the unloading apparatuses. Therefore, these apparatuses are usually housed inside the clean room or inside isolators connected to the clean room.

Since the cost of clean rooms, both for manufacturing and for maintaining the sterile environment therein, increases with their size, the known loading and unloading apparatuses raise considerably the cost of the freeze dryer.

Apparatuses are known for loading and unloading containers into and from a freeze dryer comprising two hydraulic or pneumatic cylinders, in particular a front and a rear cylinder, provided at the ends of their respective stems with transversal pushing bars.

The rear cylinder is mounted at the rear part of the freeze dryer and the stem of rear cylinder passes through the rear wall of the drying chamber so that the cylinder pushing bar can move over the freeze dryer shelves from the rear part of the shelves.

The front cylinder is mounted at the front part of the freeze dryer, next to a feeding conveyor of the containers. The stem of the front cylinder usually passes through a front wall of an isolator, which enclosed the feeding conveyor and the freeze dryer for maintaining a sterile environment therein.

Therefore these apparatuses do not increase the volume of the sterile environment since only the pushing bars and a portion of the cylinder stems is inside the drying chamber and inside the enclosure provided for the feeding conveyor.

The pushing bars of the front and rear cylinders form an enclosed space into which rows of containers are loaded one by one from the feeding conveyor, during a loading process, or from which rows of containers are unloaded one by one from a freeze dryer shelf during an unloading process.

In the loading process, the pushing bar of the front cylinder moves back and forward by a distance equivalent to the diameter of a container, each stroke for loading a single row of containers into the drying chamber. The pushing bar of the rear cylinder progressively moves towards the rear wall of the chamber, synchronously with the front cylinder movement to permit the entry of each row of containers. This operation is repeated, until the freeze dryer is full.

In the unloading process, the bar of the rear cylinder pushes out the containers placed on a shelf from the drying chamber towards the feeding conveyor.

A drawback of the above described loading and unloading apparatus is that the cylinders are provided with stems having a length almost equal to the drying chamber width, in order to load and unload containers into and from the drying chamber. Therefore, the dimension of the apparatus contributes to increase considerably the overall size of the freeze dryer, in particular the width thereof. This can create several restrictions and limitations to the layout of the plant wherein the freeze dryer is located.

Another drawback is that the use of hydraulic or pneumatic cylinders is to be avoided in pharmaceutical process in sterile environments due to risk of contamination of the product and/or of the containers. In fact, the cylinders may have leaks or escapes of non-sterile fluids, such as compressed air or hydraulic oil or the like, which can endanger the sterility of the product and/or of the containers.

An object of the invention is to improve the structure of known apparatuses for moving containers into and from an apparatus for treating material contained in such containers, i.e. a freeze dryer.

Another object is to provide an apparatus for moving containers that has compact dimensions so that to considerably reduce the overall size of the freeze dryer with which the apparatus is associated.

A further object is to provide an apparatus suitable for being used in a sterile environment, in that it reduces or substantially eliminate the risk of contamination or lack of sterility of the product and/or of the containers.

Still another object is to provide an apparatus for moving containers having a simple and efficient structure, thus economic, with a reliable operation.

According to the invention, an apparatus is provided for moving containers into or from a chamber provided with at least a supporting surface for supporting said containers, comprising a pushing element for engaging said containers and a driving arrangement for moving said pushing element through said chamber along a sliding direction, wherein said driving arrangement comprises a modular rod assembly for supporting said pushing element, said modular rod assembly comprising a set of rod elements which can be mutually and removably associated and an assembling arrangement for connecting or disconnecting said rod elements to or from said modular rod assembly so as to change a length thereof and to move said pushing element.

Owing to the invention an apparatus for moving containers can be realized with particularly compact dimensions so that to considerably reduce the overall size of an apparatus for treating a material contained in said containers, i.e. a freeze dryer, with which the apparatus is associated.

In fact, the apparatus according to the invention comprises an extendable/reducible modular rod assembly whose length depends on the number of rod elements mutually coupled.

Since the length of each rod element is relatively small it is possible to reduce significantly the longitudinal dimension of the apparatus.

The apparatus comprises an assembling arrangement and a magazine unit of the rod elements that have a very compact structure and, at the same time, are simple and efficient, with a reliable operation. In particular, the magazine unit comprises a rotating holding drum capable to receive a large number of rod elements with reduced overall dimensions.

Since the modular rod assembly can be hermetically separated from the controlled environment of chamber by a suitable covering element, i.e. plastic or metallic bellows, the apparatus of the invention allows reducing or substantially eliminating the risk of contamination or lack of sterility of the product and/or of the containers.

The invention can be better understood and implemented with reference to the enclosed drawings, that show some exemplifying and non limitative embodiments thereof, in which.

Figure 1:
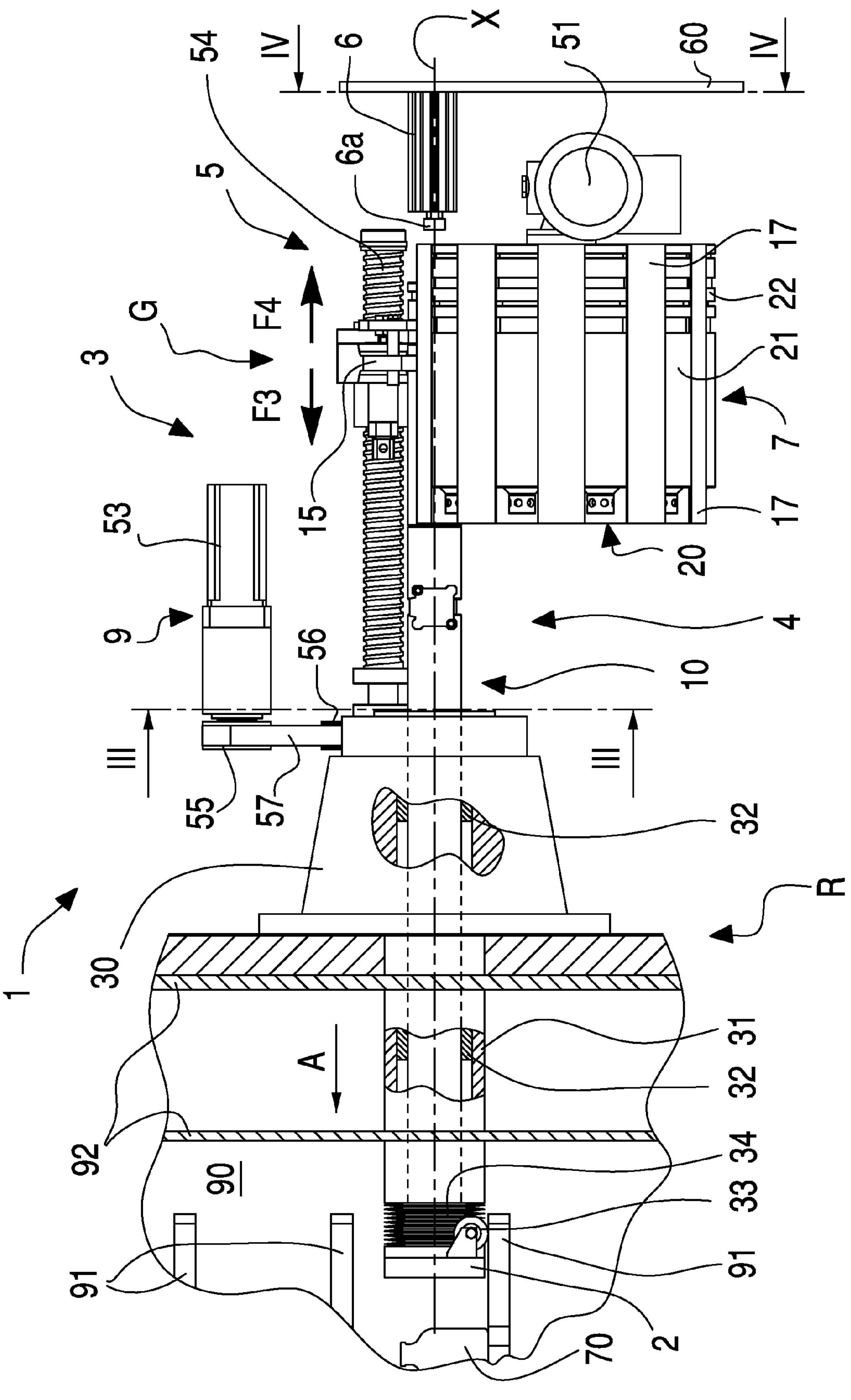
FIG. 1 is a front view of the apparatus for moving containers of the invention associated with a freeze dryer that is partially illustrated.
Figure 2:
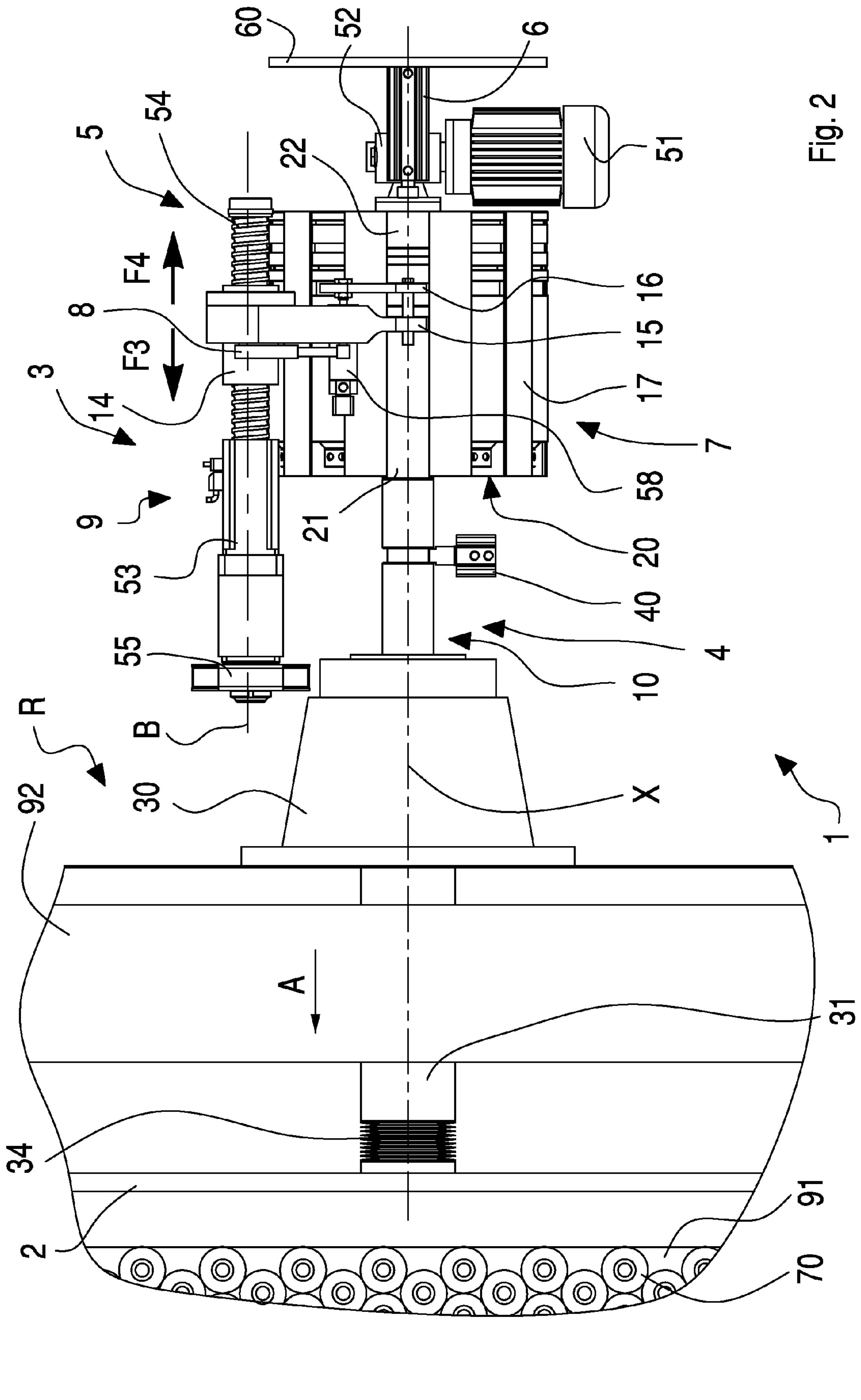
FIG. 2 is a plan view of the apparatus in FIG. 1.

With reference to FIGS. 1 and 2, numeral 1 indicates an apparatus for moving containers 70 into or from a chamber 90 provided with a plurality of supporting surfaces 91 for supporting such containers 70.

Figure 7:
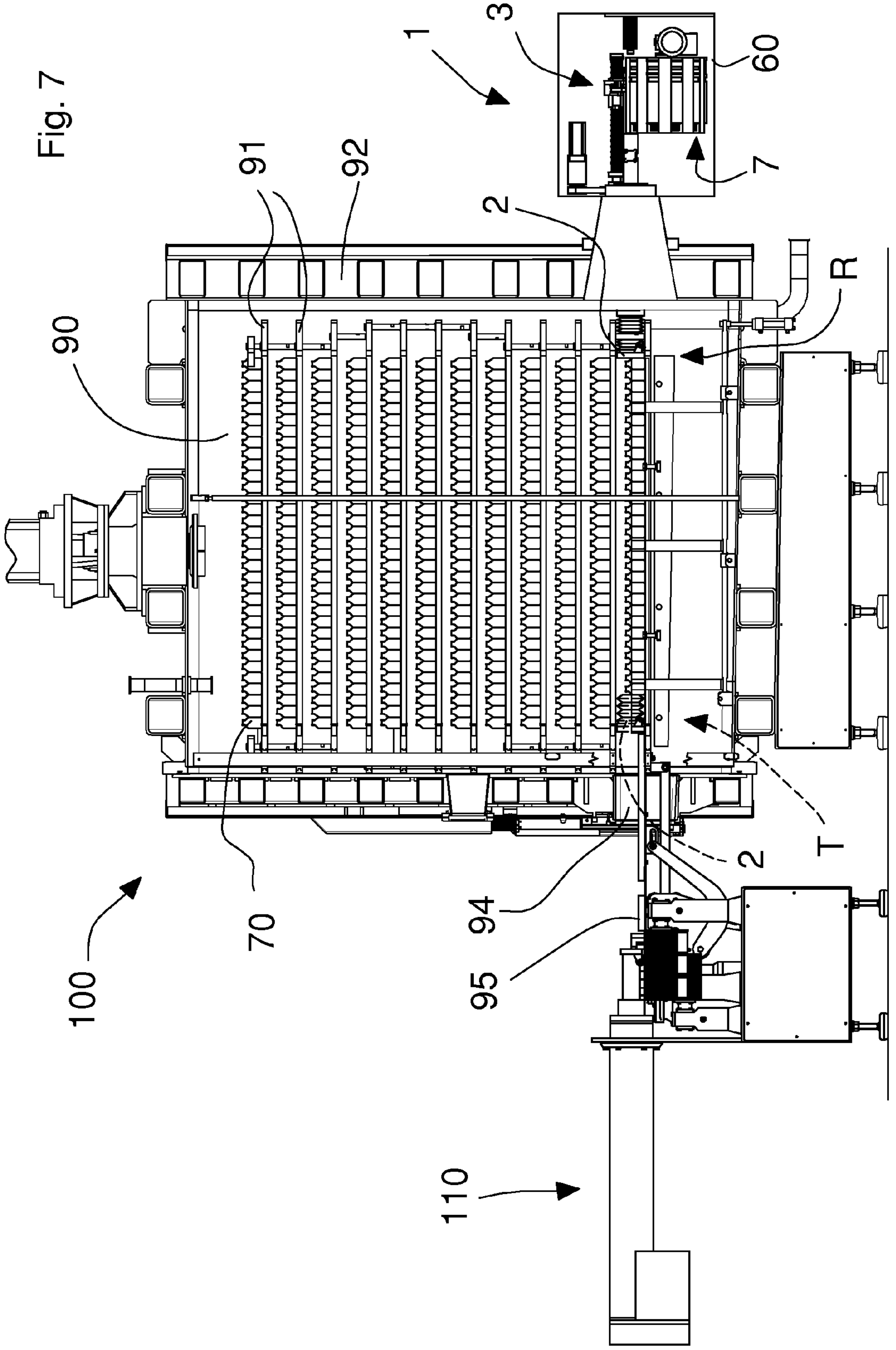
FIG. 7 is a schematic partial front view of a freeze dryer, shown in cross section, comprising a feeding conveyor, a loading apparatus for inserting containers into a drying chamber of the freeze dryer and an apparatus of the invention for unloading containers from the drying chamber.
Figure 8:
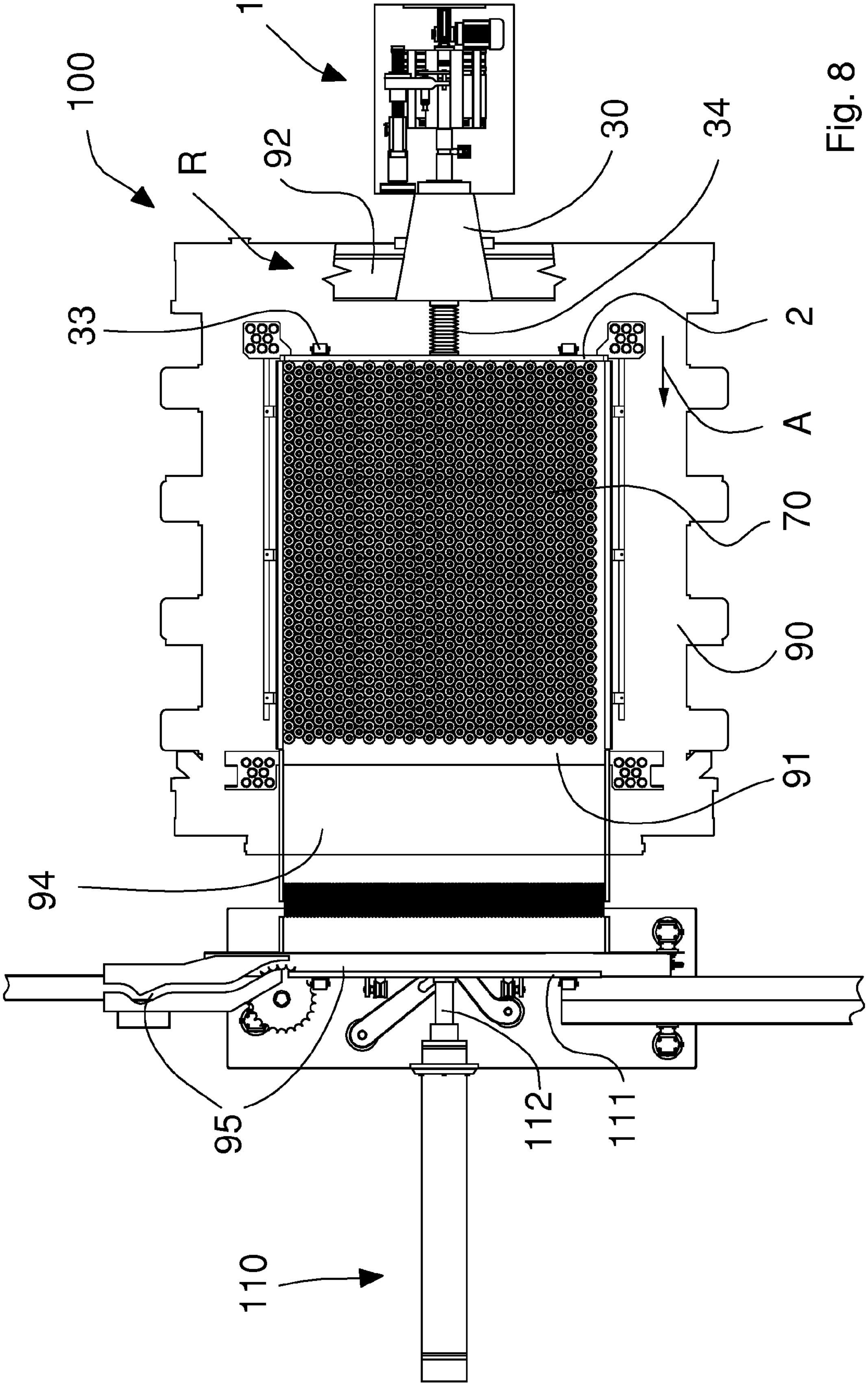
FIG. 8 is a schematic partial plan view of the freeze dryer in FIG. 7.
Figure 9:
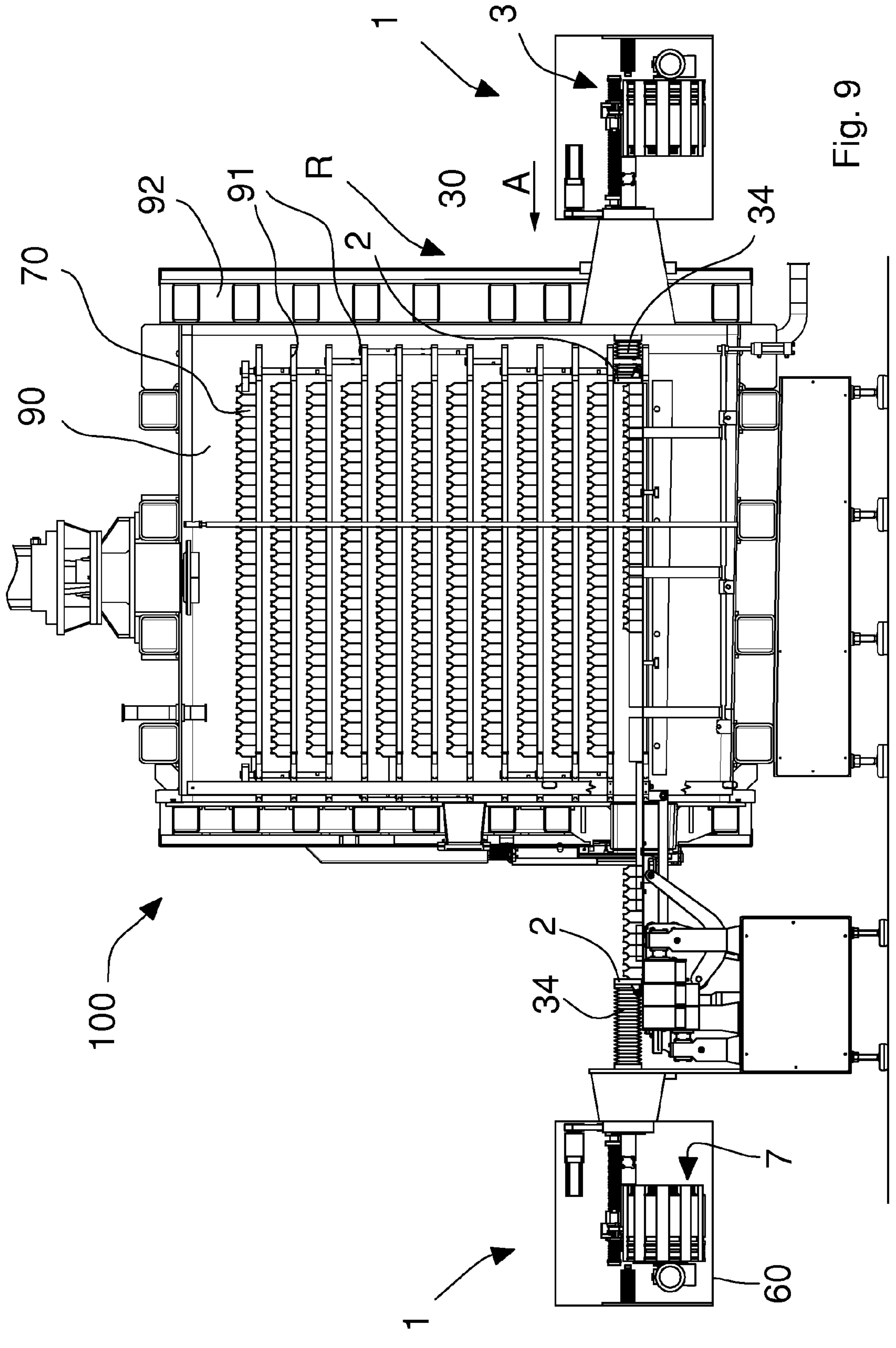
FIG. 9 is a schematic partial front view of a version of the freeze dryer in FIG. 7 including two apparatuses according to the invention, respectively for loading and unloading containers into and from the drying chamber of the freeze dryer.

In particular, the chamber 90 is a drying chamber of a freeze dryer 100 (FIG. 7), comprising a plurality of shelves or trays 91 which can be moved by a suitable lifting device, known and not shown in Figures. The shelves 91 can be moved from a collapsed position, at the bottom portion of the freeze dryer 100, to a raised position for housing a plurality of containers 70 containing a product to be freeze dried (FIGS. 7 to 9).

The containers 70 can be loaded into and/or unloaded from the drying chamber 90 through an elongated opening 94 (FIG. 7), which can be hermetically closed by a respective door.

The apparatus 1 comprises a pushing element 2 for engaging such containers 70 and a driving arrangement 3 for moving said pushing element 2 through said chamber 90 along a sliding direction A.

The sliding direction A is substantially parallel to the supporting surface 91.

The pushing element comprise an elongated transverse pushing bar 2, transversal to said direction A, in particular substantially orthogonal thereto, and having a length substantially equivalent to the shelf width so as to contact an entire row of containers 70.

The pushing bar 2 can slide over the supporting surface 91 also thanks to a couple of bearing free rolls 33.

The driving arrangement 3 includes an extendible modular rod assembly 4 arranged for supporting said pushing element 2 and comprising a set of rod elements 10, which can be mutually and removably associated so as to form a rectilinear rigid rod structure acting as a stem for moving back and forward the pushing bar 2 along the sliding direction A.

Supporting arrangements 30, 31 are provided for slidably support the modular rod assembly 4. Supporting arrangement comprises a flanged supporting member 30 and a sleeve member 31. The flanged supporting member 30 is fixed to an external surface of a freeze dryer lateral wall 92 that is opposite to the elongated opening 94. The sleeve member 31 passes through said freeze dryer lateral wall 92. The flanged supporting member 30 and the sleeve member 31 are internally provided with bushings 32 suitable for slidably receiving the rod elements 10, 20.

Since the chamber 90 of the freeze dryer 100 is airtight and encloses a sterile environment, for the sterility of the product and of the containers, a covering element 34 is provided for insulating the modular rod assembly 4 from said chamber 90. The covering element comprises a plastic or metallic bellows 34, one end of which is attached to the pushing bar 2, while the other end of the bellows 34 is attached to the sleeve member 31. Therefore, the bellows 34 expands or contracts when the modular rod assembly 4 respectively lengthens or shortens.

The bellows 34 contains the entire modular rod assembly 4 whatever is the length thereof and forms an insulated barrier between the sterile environment of the chamber 90, and the external uncontrolled environment wherein the apparatus 1 is positioned, so that to reduce or substantially eliminate the risk of contamination or lack of sterility of the product and/or of the containers.

The modular rod assembly 4 comprises a primary rod element 10 and one or more rod elements 20 aligned along a connecting axis X, parallel to the sliding direction A.

The number of rod elements 20 of the modular rod assembly 4 changes according to the required length thereof, namely according to the position of the pushing bar 2 inside the chamber 90. Each rod element 20 is connected at each end thereof to a respective adjacent rod element 10, 20.

An end of the primary rod element 10 supports the pushing bar 2 while another end 11 is designed to be connected to a rod element 20. The latter can be connected to a further rod element 20 and so on.

The driving arrangement 3 comprises an assembling arrangement 5, 6 for connecting or disconnecting progressively rod elements 20 so as to change the length of said modular rod assembly 4 in order to move said pushing element 2 back and forward through the chamber 90, as it will explained in detail in the following description.

The apparatus 1 further comprises a magazine unit 7 arranged for housing a plurality of rod elements 20.

Figure 3:
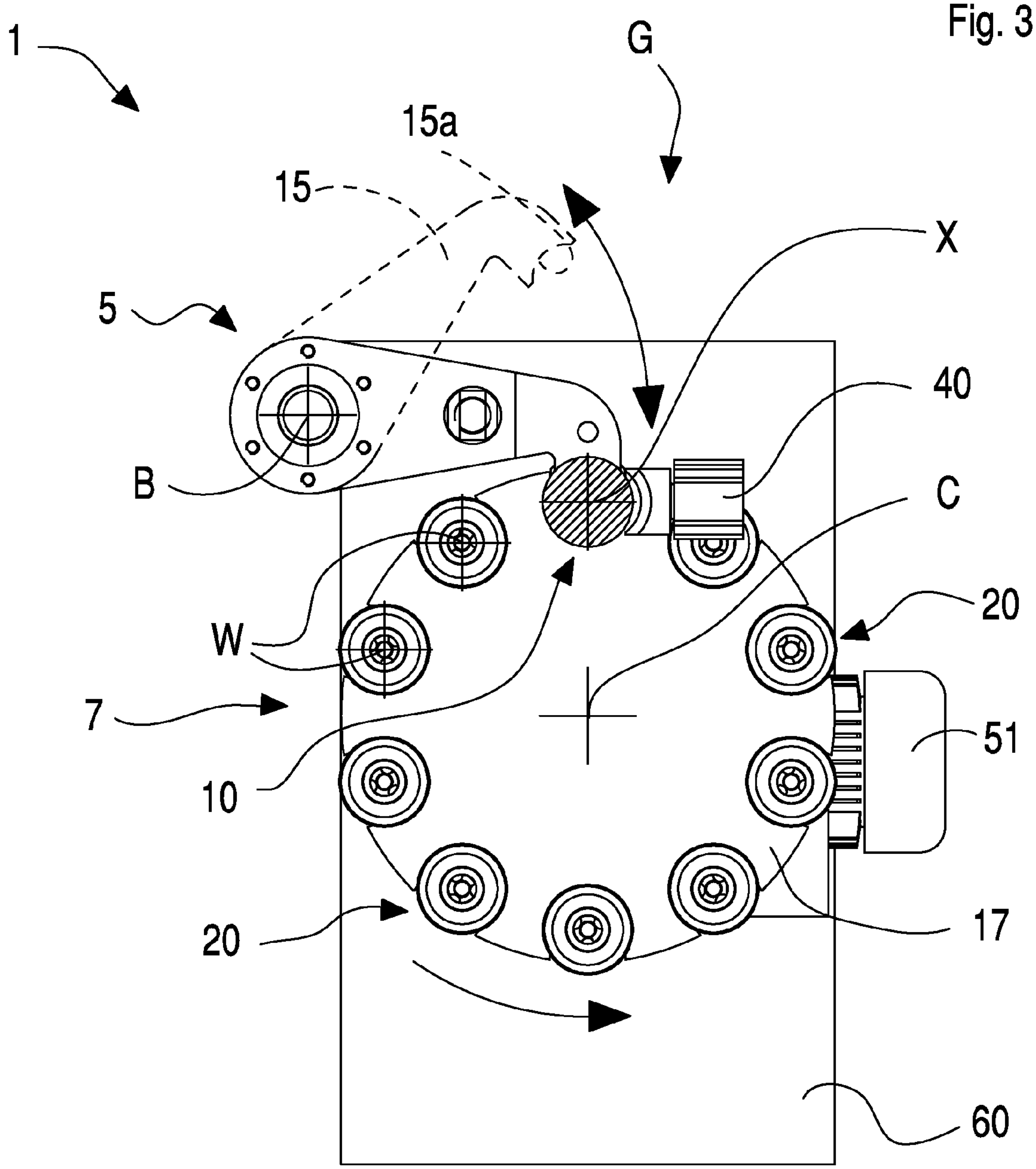
FIG. 3 is an enlarged section taken along a plane III-III in FIG. 1, showing the transferring unit and a magazine unit, a gripping arrangement of the transferring unit being illustrated in two different operational positions.
Figure 4:
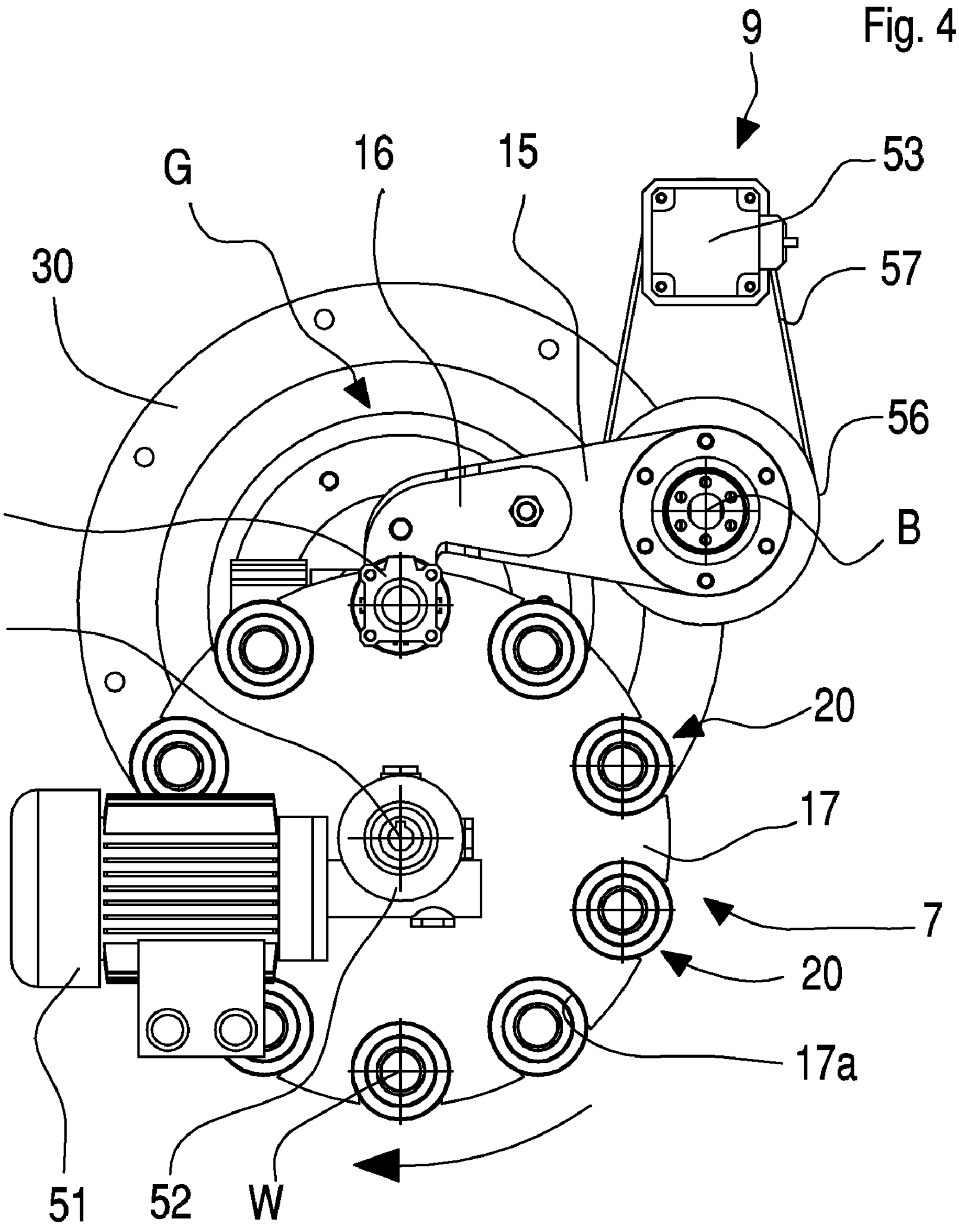
FIG. 4 is an enlarged section taken along a plane IV-IV in FIG. 1, showing the magazine unit and an actuating arrangement thereof.

As shown in FIGS. 3 and 4, the magazine unit 7 includes a holding drum 17 which can rotate around a revolving axis C. The revolving axis C is parallel to the sliding direction A and is parallel to the connecting axis X.

The holding drum 17 has a plurality of housings 17*a* realized angularly spaced on a peripheral cylindrical surface of the holding drum 17. Each housing 17*a* comprises a cylindrical surface extending along a respective longitudinal axis W and suitable for receiving a respective rod element 20. The longitudinal axis W of each housing 17*a* is parallel to the revolving axis C.

First actuating devices 51, 52 are provided for rotating the holding drum 17 and for sequentially locating each housing 17*a* so as to face a rod element 10, 20 of the modular rod assembly 4, in order to receive or to transfer a further rod element 20. In particular, when a housing 17*a* faces the modular rod assembly 4, the longitudinal axis W of said housing 17*a* is substantially aligned to the connecting axis X.

The first actuating device comprises an electrical rotating motor 51 provided with an indexer device 52 for transforming the continuous rotating motion of motor 51 in an intermittent or indexed motion, each angular step corresponding to an angular distance between two adjacent housings 17*a*.

In a version of the apparatus 1 according to the invention and not shown in the Figures, the magazine unit 7 comprises a holding member provided with a plurality of respective housings for the rod elements 20, the housings being positioned side by side along a linear direction. The holding member can be moved by a respective actuating arrangement along said linear direction that is transversal to the connecting axis X, in particular substantially orthogonal thereto.

The aforesaid linear direction can be both vertical and horizontal with respect to the supporting surfaces 91 of the chamber 90.

The assembling arrangement comprises a transferring unit 5 for extracting or inserting a single rod element 20 from or into the magazine unit 7.

The transferring unit 5 is further designed for moving each rod element 20 along the connecting axis X so as to connect or disconnect said rod element 20 to or from a rod element 10, 20 of the modular rod assembly 4.

The transferring unit 5, which is positioned alongside the magazine unit 7, comprises a gripping arrangement 14, 15 suitable for engaging a rod element 20. Said gripping arrangement include a sliding member 14 that pivotally supports an arm 15 around a rotating axis B. The sliding member 14 is movable parallel to said rotating axis B, which is substantially parallel to the connecting axis X.

The arm 15 is rotated by a second actuating device 8 (FIG. 2A) in a clamping position G in which a gripping end 15*a* of the arm 15 engages an abutting arrangement 25 (FIG. 3) of a rod element 20 to be connected to or to be disconnected from the modular rod assembly 4.

The second actuating device 8 includes a linear actuator, i.e. a pneumatic cylinder, the opposite ends thereof being hinged respectively to the sliding member 14 and to the arm 15.

The sliding member 14 is axially moved along a linear direction parallel to the connecting axis X by a third actuating device 9 so that the arm 5 can move a single rod element 20 when engaging the abutting arrangement 25 thereof.

The third actuating device 9 comprises a further electrical rotating motor 53 that rotates a transmission arrangement 54, 55, 56, 57 for axially moving the transferring unit 5.

The transmission arrangement includes, for example, a lead screw 54 coupled to a nut screw connected to or directly realized in the sliding member 14 of the transferring unit 5.

Rotating motor 53 rotates the lead screw 54 through pulleys 55, 56 interconnected by a belt 57 and thus axially moves the sliding member 14.

In a version of the apparatus 1 that is not shown, the third actuating device 9 comprises a linear actuator, i.e. a linear pneumatic or electrical actuator, which axially moves the sliding member 14. In this case, guiding members are provided for slidably supporting the transferring unit 5. The guiding members are fixed to a frame 60 of the apparatus 1.

Figure 6:
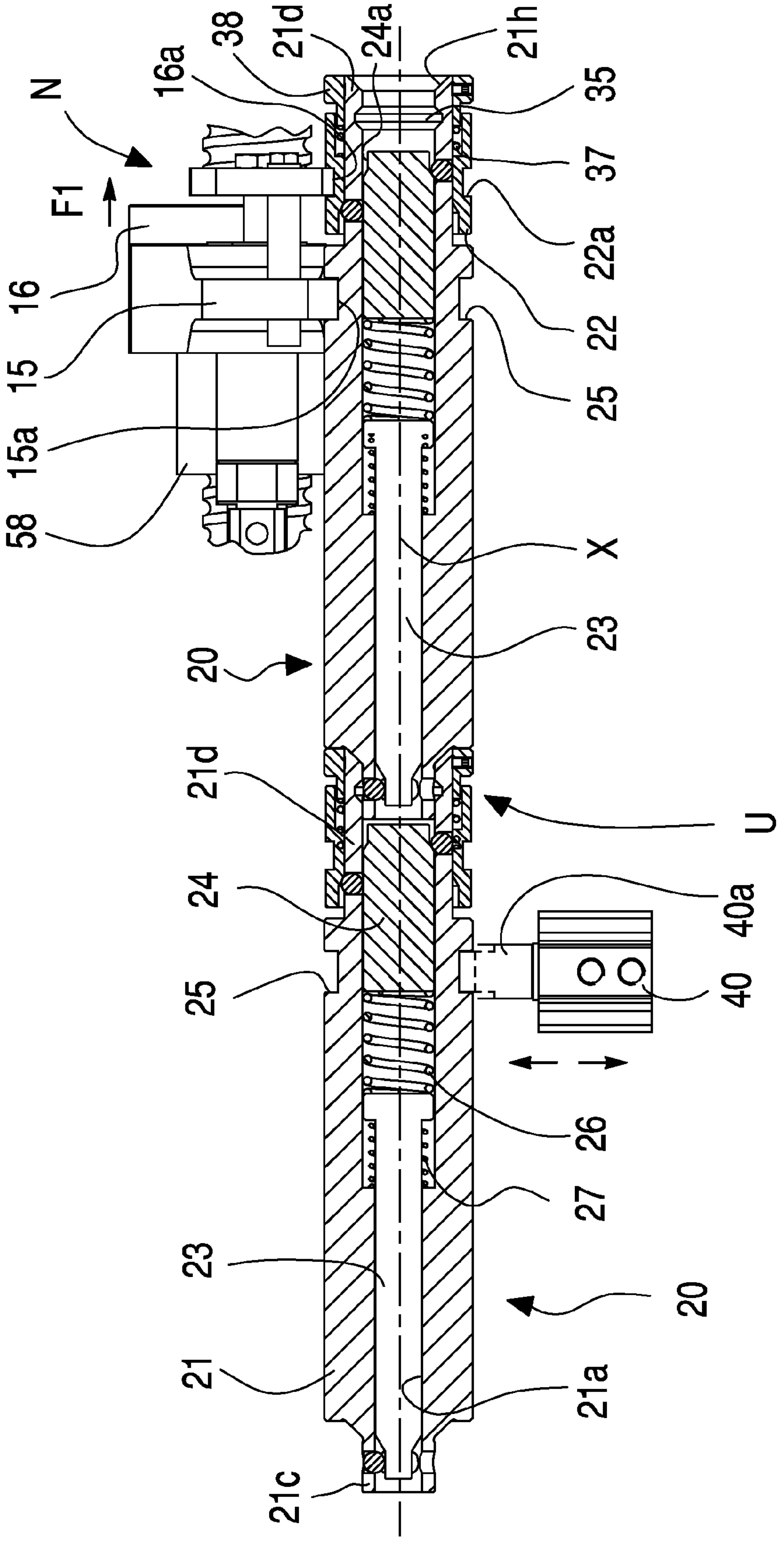
FIG. 6 is a cross section of two rod elements in an uncoupled condition.

The transferring unit 5 further comprises a lever 16 slidably supported by the arm 15 and provided with a respective gripping end 16*a* suitable for engaging a locking sleeve 22 of the rod element 20 in the clamping position G of the arm 5 (FIG. 6).

Figure 5:
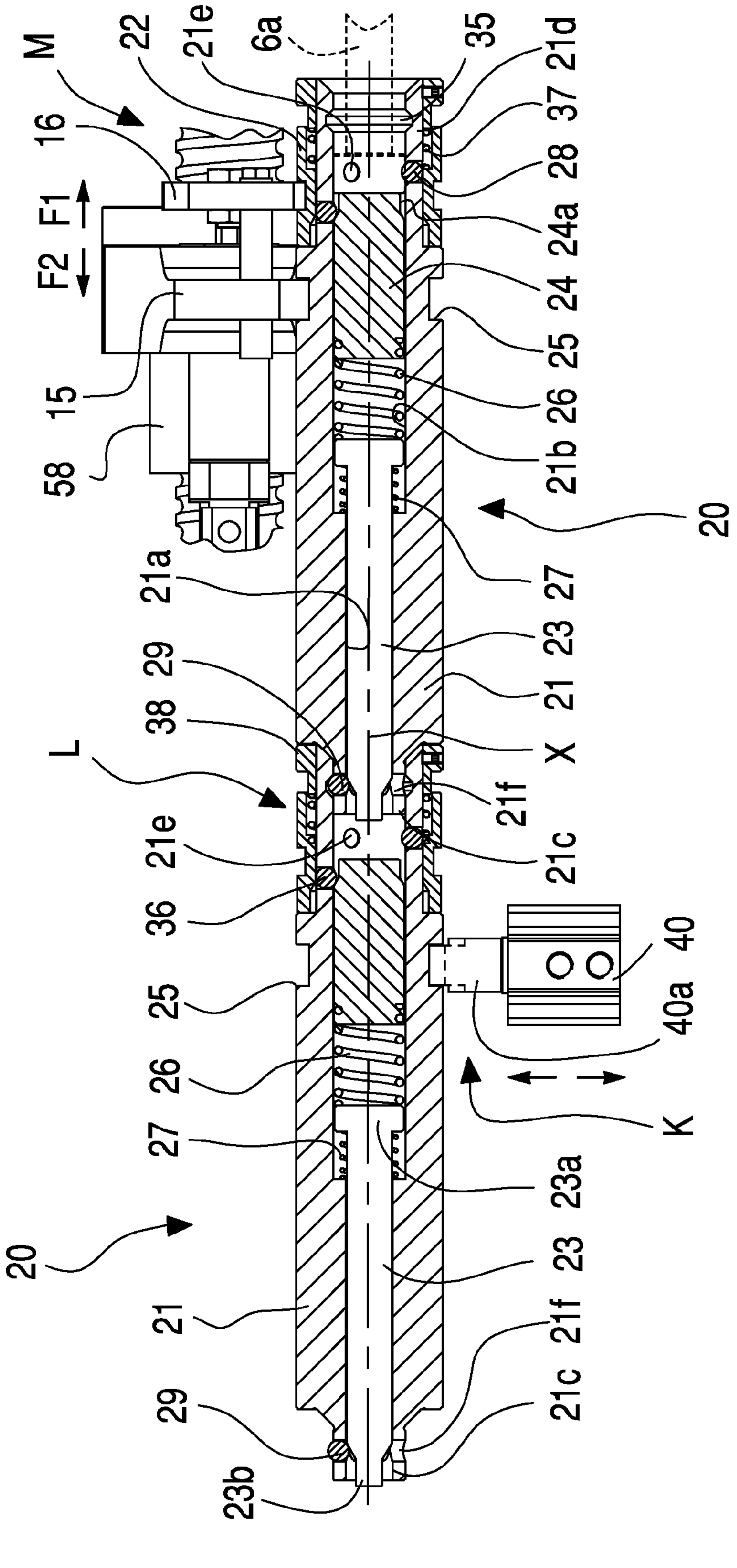
FIG. 5 is a cross section of two rod elements in a coupled condition.

The lever 16 is movable in a direction parallel to the rotating axis B by means of a fourth actuating device 58, which comprises, for instance, a linear actuator, pneumatic or electrical. The lever 16 can be moved by the fourth actuating device 58 between two opposite operating positions, as illustrated in FIGS. 5 and 6.

Each rod element 20 includes an elongated tubular body 21, for example a cylindrical body, provided with a longitudinal cylindrical through hole, which forms a first cavity 21*a* and a second cavity 21*b*. The first cavity 21*a* has an opening at a first end 21*c* of the tubular body 21, while the second cavity 21*b* has a receiving opening 21*h* provided at a second end 21*d* of the tubular body 21. The diameter of the first cavity 21*a* is smaller than the diameter of second cavity 21*b*.

The first end 21*c* of the hollow body 21 is tapered, suitably shaped so that to be easily inserted into the receiving opening 21*h* of the second cavity 21*d* of an adjacent rod element 20. In particular, the first end 21*c* and the receiving opening 21*h* are complementary shaped for a precise coupling of two rod elements 20.

Figure 2A:
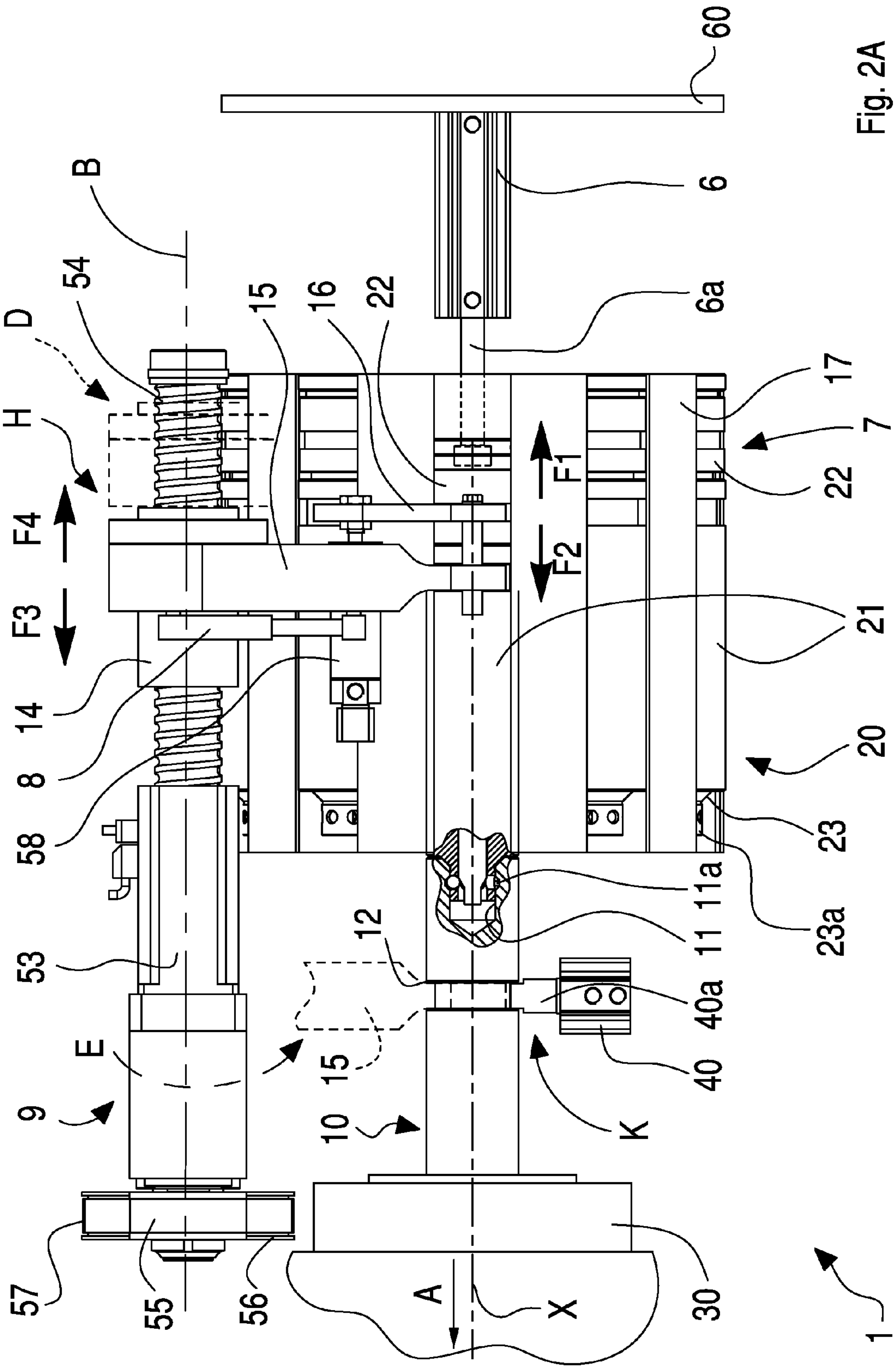
FIG. 2A is an enlarged view of a detail of FIG. 2, showing a transferring unit in an intermediate position and, partially shown in broken line, in a final position.

Similarly the primary rod element 10 is provided with a respective receiving opening 11 suitable for housing the first end 21*c* of a rod element 20 (FIG. 2A).

The second end 21*d* of the tubular body 21 further includes an annular seat for slidably receiving a locking sleeve 22 of a locking arrangement, the use of which will be explained in the following description.

Each rod element 20 also includes a first pin 23 and a second pin 24, which are slidably housed in the cavities 21*a*, 21*b*. The first pin 23 is partially inserted in the first cavity 21*a*, while the second pin 24 is completely received in the second cavity 21*b*.

The first pin 23 and the second pin 24 are movable along the longitudinal axis of the tubular body 21 and they are mutually spaced by a first elastic member 26, comprising for example a helical compression spring.

A second elastic member 27 is provided for acting on a head 23*a* of the first pin 23. The second elastic member 27, that comprises for example a respective helical compression spring, pushes the first pin 23 against the second pin 24.

A first stopping arrangement 28 is provided in order to prevent the second pin 24 to be pushed out of the second cavity 21*b*, while the first pin 23 is unable to come out from the first cavity 21*a* because the dimension of the head 23*a* is greater than the diameter of the first cavity 21*a*.

The first stopping arrangement 28 includes one or more first stopping elements, i.e. balls that are inserted in respective seats 21*e* realized in the second end 21*d* of the tubular body 21. First stopping elements 28 radially slightly protrude into the second cavity 21*b* so as to engage an end portion 24*a* of the second pin 14 in order to stop the axial movement of the latter according to the direction of the arrow F1 (FIG. 6). First stopping elements 28 are retained in this protruding position by the locking sleeve 22.

A blocking arrangement 29 is provided on the first end 21*c* of the tubular body 21 for removably fastening the first end 21*c* to a corresponding receiving opening 21*h* of the second cavity 21*b* of an adjacent rod element 20, in a locked condition L of the two rod elements 20.

The blocking arrangement 29 includes one or more blocking elements, i.e. balls, inserted in respective seats 21*f* realized in the first end 21*c* of tubular body 21.

As better explained in the description of the apparatus operation, in the locked condition L the first pin 23 is pushed outwards by the second pin 24 so that a tapered end 23*b* of the first pin 23 abuts on the blocking elements 29. The tapered end 23*b* forces the blocking elements 29 to protrude radially from the external surface of the first end 21*c* and thus to engage a receiving groove 35 realized in the second cavity 21*b* of an adjacent rod element 20.

The blocking elements 29 and the shape of the tapered end 23*b* prevent the first pin 23 to come out from the first cavity 21*a*.

Locking arrangement 22, 36 is provided for preventing the second pin 24 to move along the direction of the arrow F1 so as to maintain the first pin 23 engaged to the blocking elements 29 in the locking condition L (FIG. 5).

The locking arrangement further comprises a second stopping arrangement 36 provided in the second end 21*d* of the tubular body 21. The second stopping arrangement includes one or more second stopping elements 36, i.e. balls that are inserted in respective seats radially realized in the second end 21*d* of the tubular body 21.

The second stopping elements 36 are movable inside the respective seat according to a position of the locking sleeve 22 so as to prevent or to avoid the second pin 24 moving along the direction of the arrow F1.

In an engagement position M the locking sleeve 22 maintains the second stopping elements 36 partially protruded into the second cavity 21*b* so as to engage the end portion 24*a* of the second pin 24.

In a disengagement position N of the locking sleeve 22 the second stopping elements 36 are free to protrude out from the second cavity 21*b*, pushed by the second pin 24 which can move along the direction of the arrow F1. More precisely, the first pin 23 and the second pin 24 are pushed by the first elastic member 26 and the second elastic member 27 in an unlocked condition U, wherein the first end 23*b* is disengaged from the blocking elements 29 and the second pin 24 abuts on the first stopping arrangement 28 (FIG. 6).

A third elastic member 37 is provided for maintaining the locking sleeve 22 in the engagement position M. The third elastic member 37 comprises, for example, a respective helical compression spring which abuts on a ring nut 38 screwed to a threaded external portion of the second end 21*d* of tubular body 21.

The locking sleeve 22 is moved between said engagement position M and said disengagement position N by means of the lever 16 of the transferring unit 5. For this reason, the locking sleeve 22 has an annular groove 22*a* suitable to be engaged by the gripping end 16*a* of the lever 16.

The assembling arrangement further comprises an inserting device 6 for moving the first pin 23, by means of the second pin 24 and the first elastic member 26, in the direction of arrow F2 in the locked condition L so that to move the blocking elements 29.

The inserting device 6 comprises a linear actuator, i.e. a pneumatic cylinder, provided with a stem 6*a*, which can be inserted into the second cavity 21*b* of the tubular body 21 for abutting on the second pin 24. The stem 6*a* moves along the connecting axis X of the modular rod assembly 4.

A further locking arrangement 40 is provided for blocking the modular rod assembly 4 in a stop position K. The further locking arrangement 40 blocks the primary rod element 10 or a rod element 20 of the modular rod assembly 4 that is partially inserted into the supporting arrangement 30, 31. The further locking arrangement 40 comprises a linear actuator, i.e. a pneumatic cylinder, provided with a stem 40*a* arranged for engaging, with a respective shaped end, the abutting arrangement 25 of said rod element 20 or a further abutting arrangement 12 of the primary rod element 10.

The operation of the apparatus 1 for moving the pushing bar 2 in the sliding direction A for unloading containers 70 from a supporting surface 91 of the chamber 90 will be now described.

In a retracted condition R shown in FIG. 1 the modular rod assembly 4 comprises only the primary rod element 10 that supports the pushing bar 2, said pushing bar 2 being disengaged from the containers and from the supporting surface 91 for allowing containers 70 to be loaded on the shelves 91 and/or for allowing said shelves 91 to be vertically moved by the lifting device of the freeze dryer 100.

The primary rod element 10 is blocked by the locking arrangement 40 that acts on the respective further abutting arrangement 12, i.e. an annular groove, realized on the external cylindrical surface of said primary rod element 10.

The holding drum 17 of the magazine unit 7 is angularly positioned so that to position a rod element 20 to be coupled to the primary rod element 10, said rod element 20 being received in a housing 17*a* of the holding drum 17, said housing 17*a* being aligned and facing said primary rod element 10.

The transferring unit 5 is operated for extracting said rod element 20 from the respective housing 17*a* of the holding drum 17 and for moving the rod element 20 according to the direction of the arrow F3 so as to engage the primary rod element 10.

More precisely, the sliding member 14 moves from an initial position D, wherein the arm 15 engages the abutting arrangement 25 of the rod element 20 in the clamping position G, to an intermediate position H, wherein the first end 21*c* of the rod element 20 is fully inserted in the respective receiving opening 11 of the primary rod element 10.

At this point, the inserting device 6 can be activated for moving in the direction of the arrow F2 the second pin 24 and, through the first elastic member 26, the first pin 23 in the locked condition L. In this way, the tapered end 23*b* of the first pin 23 can push the blocking elements 29 outwards from their seats 21*f* so that to engage a respective receiving groove 11*a* of the receiving opening 11 of the primary rod element 10. Therefore it is possible to firmly couple the rod element 20 to the primary rod element 10.

At the same time, the position of the second pin 24 inside the second cavity 21*b* is such as to allow the locking sleeve 22 to be pushed by the third elastic member 37 to the engagement position M wherein said locking sleeve 22 maintains the second stopping elements 36 partially protruded into the second cavity 21*b* so as to engage and to stop the second pin 24 when the inserting device 6 is retracted.

The transferring unit 5 now can be further activated to fully extract the rod element 20 from the magazine unit 7 and to move at the same time the modular rod assembly 4 and the pushing bar 2 inwards into the chamber 90, according to the direction of the arrow F3. In particular, the sliding member 14 is moved by the third actuating device 9 from the intermediate position H to a final position E.

When the rod element 20 is completely removed from the respective housings 17*a* of the holding drum 17, the latter can be rotate around the revolving axis C by the first actuating devices 51, 52 so as to place another rod element 20 aligned and facing the modular rod assembly 4.

The arm 5 is then rotated from the clamping position G so as to disengage the rod element 20 that is now firmly coupled to the modular rod assembly 4.

The sliding member 14 is then moved back according to the direction of the arrows F4 to the initial position D wherein the arm 5 can be rotated in the clamping position G to engage a further rod element 20 housed in the holding drum 17.

Such further rod element 20 can be coupled to the modular rod assembly 4 according to the operational sequence above described.

Such operational sequence can be repeated until the whole set of the rod elements 20 loaded in the magazine unit 7 are coupled each other to form the modular rod assembly 4 in an extended condition T (FIG. 7).

By coupling one by one the rod elements 20 to the modular rod assembly 4, the pushing bar 2 is progressively moved in the direction A through the chamber 90 so as to unload the containers 70 from the respective supporting surface 91, namely to transfer said containers 70 from the chamber 90 to a conveyor unit 95 positioned alongside the freeze dryer 100. The operation of apparatus 1 for moving back the pushing bar 2 from the extended condition T to the retracted condition R of the modular rod assembly 4 will be now described.

In the extended condition T, a terminal rod element 20 of the modular rod assembly 4, namely a rod element 20 which is at the opposite end of the modular rod assembly 4 with respect to the pushing bar 2 and which partially protrudes from the supporting arrangement 30, is still engaged by the arm 15 and the lever 16 of the transferring unit 5, the sliding member 14 thereof being in the final position E.

The sliding member 14 is moved by the third actuating device 9 according to the direction of the arrow F4 from said final position E to the intermediate position H in order to partially insert the terminal rod element 20 to be disconnected into a respective housing 17*a* of the holding drum 17. Since said rod element 20 is still coupled to the modular rod assembly 4, the transferring unit 5 moves together the modular rod assembly 4 and the pushing bar 2 in the direction of the arrow F4.

In the intermediate position H of the transferring unit 5, the abutting arrangement 25 of the rod element 20 adjacent to said rod element 20 to be disconnected could be engaged by the locking arrangement 10 so as to block the modular rod assembly 4 in the stop position K.

The lever 16 of the transferring unit 5 is then moved by fourth actuating device 58 so as to shift the locking sleeve 22 from the engagement position M to the disengagement position N, wherein the first pin 23 and the second pin 24 can freely move in the direction of the arrow F1, pushed by the first elastic member 26 and the second elastic member 27 till the end portion 24*a* of the second pin 24 mates the first stopping arrangement 28, at the unlocked condition U. Therefore, the tapered end 23*b* of the first pin 23 disengages the blocking arrangement 29 of the rod element 20 to be disconnected from the receiving groove 35 of the adjacent rod element 20 of the modular rod assembly 4.

At this point, the sliding member 14 is further moved by the third actuating device 9 from the intermediate position H to the initial position D in order to completely disengage the rod element 20 to be disconnected from the modular rod assembly 4, the rod element 20 being fully inserted into the respective housing 17*a*.

As soon as the arm 15 of the transferring unit 5 rotates for disengaging the rod element 20, the holding drum 17 can be rotate so that to position an empty housing 17*a* facing a new terminal rod element 20 of the modular rod assembly 4. At the same time, the sliding member 14 is moved from the initial position D to the final position E wherein the arm 5 rotates in the clamping position G so as to engage the abutting arrangement 25 of new terminal rod element 20. The latter is then disconnected from the modular rod assembly 4 and inserted into the holding drum 17 according to the operational sequence above described.

Such operational sequence is repeated until the whole set of the rod elements 20 of the modular rod assembly 4 are disconnected and loaded into the magazine unit 7.

At the end of said operational sequence the modular rod assembly 4 only comprises the primary rod element 10 and is in the retracted condition R. Thus, an empty shelf 91 from which the apparatus 1 has unloaded the containers 70 can be lowered in the collapsed position at the bottom portion of the freeze dryer 100. Then a shelf 91 provided with the containers 70, can be lowered at the level of the modular rod assembly 4 and the operational sequence for unloading such containers could be repeated.

With reference to FIGS. 7 and 8, a freeze dryer 100 is shown comprising an apparatus 1 according to the invention, for unloading containers 70 from the drying chamber 90, and a loading apparatus 110, of known type, for inserting the containers into the drying chamber 90.

The loading apparatus 110 comprises a linear actuator, such as a pneumatic cylinder, that is provided with an inner stem 112 supporting a respective transversal pushing bar 111. The length of the inner stem 112 is such to move the transversal pushing bar 111 through the entire width of the drying chamber 90. Therefore, the loading apparatus 110, as clearly shown in the Figures, has a longitudinal dimension greater than the longitudinal dimension of the apparatus 1 of the invention, and increases considerably the overall size of the freeze dryer, in particular the width thereof.

The apparatus 1 for moving containers can be also used for inserting containers 70 into the drying chamber 90. In this case, the pushing bar 2 is moved back and forward through the chamber 90 by the modular rod assembly 4 for progressively loading rows of containers on respective shelves 91. The length of the modular rod assembly 4 is changed during the container loading process by assembling or disassembling rod elements 20 according to the operational sequence described above.

As shown in FIG. 9, a version of the freeze dryer 100 comprises a second apparatus 1 according to the invention for loading containers 70 into the drying chamber 90, the containers 70 being conveyed in front of the elongated opening 94 of the chamber 90 by a suitable conveyor 95.

The use of two opposite apparatus 1 for moving containers associated to the freeze dryer 100 allows considerably reducing the overall size of the freeze dryer 100.

The invention claimed is:

1. Apparatus for moving containers into or from a chamber provided with at least a supporting surface for supporting said containers, comprising a pushing element for engaging said containers and a driving arrangement for moving said pushing element through said chamber along a sliding direction, wherein said driving arrangement comprises, a modular rod assembly for supporting said pushing element, said modular rod assembly comprising a set of rod elements which can be mutually and removably associated, and an assembling arrangement for connecting or disconnecting said rod elements to or from said modular rod assembly so as to change a length thereof and to move said pushing element.

2. Apparatus according to claim 1, wherein said pushing element comprises an elongated pushing bar, transversal to said sliding direction.

3. Apparatus according to claim 2 wherein said pushing bar is provided with a rolling element arranged for sliding over said supporting surface.

4. Apparatus according to claim 2, wherein said modular rod assembly comprises at least a primary rod element, an end of which supports said pushing bar, a remaining end of which being designed to be coupled to a rod element.

5. Apparatus according to claim 4, wherein said modular rod assembly comprises, in an extended condition, said primary rod element and a plurality of rod elements, said rod elements being mutually coupled and being aligned along a connecting axis parallel to said sliding direction.

6. Apparatus according to claim 1, wherein each rod element includes an elongated tubular body whose opposite ends are provided with a connecting arrangement for connecting said rod element to two adjacent rod elements.

7. Apparatus according to claim 6, wherein said connecting arrangement comprises a first end and a receiving opening realized in an opposite second end of said elongated tubular body, said first end and said receiving opening having complementary shapes.

8. Apparatus according to claim 7, wherein said modular rod assembly comprises at least a primary rod element, an end of which supports said pushing bar, a remaining end of which being designed to be coupled to said rod element and said primary rod element comprises a respective receiving opening for housing a first end of a rod element.

9. Apparatus according to claim 8, wherein each rod element includes a blocking arrangement for removably fastening said first end of said rod element to a corresponding receiving opening of an adjacent rod element.

10. Apparatus according to claim 9, wherein said blocking arrangement comprises at least one blocking element movable into a respective seat of said first end so as to engage a receiving groove realized in the receiving opening of said adjacent rod element.

11. Apparatus according to claim 9, wherein each rod element comprises a pin arrangement slidably housed into a cavity of said tubular body and arranged for acting on said blocking arrangement.

12. Apparatus according to claim 11, wherein said blocking arrangement comprises at least one blocking element movable into a respective seat of said first end so as to engage a receiving groove realized in the receiving opening of said adjacent rod element and said pin arrangement is movable at least between an unlocked position, in which said pin arrangement keeps said blocking element disengaged from said receiving groove, and a locked position, in which said pin arrangement moves said blocking element to engage said receiving groove.

13. Apparatus according to claim 12, wherein each rod element comprises an elastic member acting on said pin arrangement for maintaining said pin arrangement in said unlocked position.

14. Apparatus according to claim 13, wherein each rod element comprises a first stopping arrangement for engaging and stopping said pin arrangement pressed by said elastic member in said unlocked position.

15. Apparatus according to claim 12, wherein each rod element comprises a locking arrangement for blocking said pin arrangement in said locked position.

16. Apparatus according to claim 15, wherein said locking arrangement comprises a second stopping arrangement associated with said second end of said tubular body, said second stopping arrangement being movable so as to engage and to stop said pin arrangement in said locking position.

17. Apparatus according to claim 16, wherein said locking arrangement further comprises a locking sleeve slidably associated with said second end of said tubular body and suitable for acting on said second stopping arrangement.

18. Apparatus according to claim 17, wherein said locking sleeve is movable from an engagement position wherein said locking sleeve keeps said second stopping arrangement engaged to said pin arrangement, and a disengagement position, wherein said locking sleeve allows said second stopping arrangement to be disengaged from said pin arrangement.

19. Apparatus according to claim 18, wherein each rod element comprises a further elastic member acting on said locking sleeve for maintaining the latter in said engagement position.

20. Apparatus according to claim 12, wherein said assembling arrangement comprises an inserting device for engaging and moving said pin arrangement between said unlocked position and said locked position.

21. Apparatus according to claim 20, wherein said inserting device comprises a linear actuator provided with a stem arranged for abutting on said pin arrangement.

22. Apparatus according to claim 15, and further comprising a further locking arrangement for blocking the modular rod assembly in a stop position.

23. Apparatus according to claim 22, wherein said further locking arrangement comprises a further linear actuator provided with a further stem arranged for engaging an abutting arrangement of a rod element of said modular rod assembly.

24. Apparatus according to claim 23, wherein said abutting arrangement comprises a respective annular groove.

25. Apparatus according to claim 11, wherein said pin arrangement comprises a first pin and a second pin mutually spaced by first elastic member.

26. Apparatus according to claim 25, wherein said first pin includes a tapered end suitable for engaging said blocking arrangement.

27. Apparatus according to claim 25, wherein each rod element comprises a first stopping arrangement for engaging and stopping said pin arrangement and said locking arrangement comprises a second stopping arrangement associated with said second end of said tubular body and said second pin includes an end portion suitable for engaging said first stopping arrangement and/or said second stopping arrangement.

28. Apparatus according to claim 1, further comprising a magazine unit for housing a plurality of rod elements.

29. Apparatus according to claim 28, wherein said magazine unit comprises a holding drum provided with a plurality of housings for housing said rod elements.

30. Apparatus according to claim 29, wherein said holding drum is rotatably mounted around a revolving axis substantially parallel to said sliding direction.

31. Apparatus according to claim 29, wherein said plurality of housings are realized angularly spaced on a peripheral surface of said holding drum.

32. Apparatus according to claim 29, and further comprising a first actuating device for rotating said holding drum so as to position in sequence a housing facing said modular rod assembly.

33. Apparatus according to claim 28, wherein said magazine unit comprises a holding member provided with a plurality of respective housings for said rod elements, said respective housings being positioned side by side along a linear direction.

34. Apparatus according to claim 33, wherein said holding member is slidably movable by respective actuating arrangement along said linear direction, which is transversal to a connecting axis.

35. Apparatus according to claim 28, wherein said assembling arrangement comprises a transferring unit arranged for extracting or inserting a single rod element from or into said magazine unit and for moving said rod element along said sliding direction so as to connect or disconnect said rod element to or from said modular rod assembly.

36. Apparatus according to claim 35, wherein said transferring unit comprises a gripping arrangement arranged for engaging a rod element.

37. Apparatus according to claim 36, wherein said gripping arrangement comprises a sliding member pivotally supporting an arm element that rotates around a rotating axis, said sliding member being movable parallel to said rotating axis, which is substantially parallel to said sliding direction.

38. Apparatus according to claim 37, and further comprising a second actuating device for rotating said arm element in a clamping position in which a gripping end of said arm element engages an abutting arrangement of a rod element.

39. Apparatus according to claim 37, and further comprising a third actuating device for axially moving said sliding member.

40. Apparatus according to claim 39, wherein said third actuating device comprises a rotating motor coupled by a transmission arrangement to said sliding member.

41. Apparatus according to claim 40, wherein said transmission arrangement comprises a lead screw coupled to a nut screw associated with said sliding member, said lead screw being rotated by said rotating motor through a pulley arrangement interconnected by a belt.

42. Apparatus according to claim 39, wherein said transferring unit further comprises a lever element slidably supported by said arm element and provided with a respective gripping end arranged for engaging a locking sleeve of a rod element in the clamping position of said arm element.

43. Apparatus according to claim 42, wherein said locking sleeve is movable from an engagement position wherein said locking sleeve keeps said second stopping arrangement engaged to said pin arrangement, and a disengagement position, wherein said locking sleeve allows said second stopping arrangement to be disengaged from said pin arrangement and said lever element is movable along a direction substantially parallel to said rotating axis so as to move said locking sleeve between said engagement position and said disengagement position.

44. Apparatus according to claim 43, and further comprising a fourth actuating device for moving said lever element.

45. Apparatus according to claim 1, and further comprising a supporting arrangement fixed to a lateral wall of said chamber and arranged for slidably supporting said modular rod assembly along said sliding direction.

46. Apparatus according to claim 45, wherein said supporting arrangement comprises a flanged supporting member connected to an external surface of said lateral wall and a sleeve member passing through said lateral wall.

47. Apparatus according to claim 45, comprising a covering member for insulating said modular rod assembly within said chamber.

48. Apparatus according to claim 47, wherein said pushing element comprises an elongated pushing bar, transversal to said sliding direction and said supporting arrangement comprises a flanged supporting member connected to an external surface of said lateral wall and a sleeve member passing through said lateral wall and said covering member comprises an expandable bellows interposed between said pushing bar and said sleeve member.

49. Freeze dryer provided with a chamber and a plurality of supporting surfaces for supporting containers comprising at least an apparatus according to claim 1 for moving said containers into or from said chamber.

* * * * *